(12) United States Patent
Fujibayashi et al.

(10) Patent No.: US 6,307,661 B1
(45) Date of Patent: Oct. 23, 2001

(54) COLOR IMAGING READING APPARATUS

(75) Inventors: Kazuo Fujibayashi, Yokohama; Shinichi Arita, Kaho-machi, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/550,317

(22) Filed: Apr. 14, 2000

(30) Foreign Application Priority Data

Apr. 16, 1999 (JP) .................................................. 11-109464
Apr. 19, 1999 (JP) .................................................. 11-110780

(51) Int. Cl.$^7$ .................................................. G02B 26/08

(52) U.S. Cl. .......................... 359/207; 358/474; 358/497

(58) Field of Search .................................... 359/196, 207, 359/201; 358/471, 474, 494, 497

(56) References Cited

U.S. PATENT DOCUMENTS 5,585,926 * 12/1996 Fujii et al. .......................... 358/471

* cited by examiner

*Primary Examiner*—James Phan
(74) *Attorney, Agent, or Firm*—Fitzpatrick, Cella, Harper & Scinto

(57) ABSTRACT

A color image reading apparatus comprises at least three line sensors arranged at predetermined intervals in the sub-scanning direction, an imaging optical system including at least one anamorphic lens for forming an image of an original on the line sensors, and a drive means for driving the original and the line sensors relative to each other in the sub-scanning direction. Each line sensor has a plurality of light receiving pixels arranged in the main-scanning direction. The apparatus satisfies the requirement expressed by the formula $|Dis(s)|<0.25W/S_0$, where $S_0$ is the distance separating adjacently located line sensors, W is the width of the light receiving pixels in the sub-scanning direction and $Dis(s)$ is the distortion component of the imaging optical system in the sub-scanning direction.

6 Claims, 13 Drawing Sheets

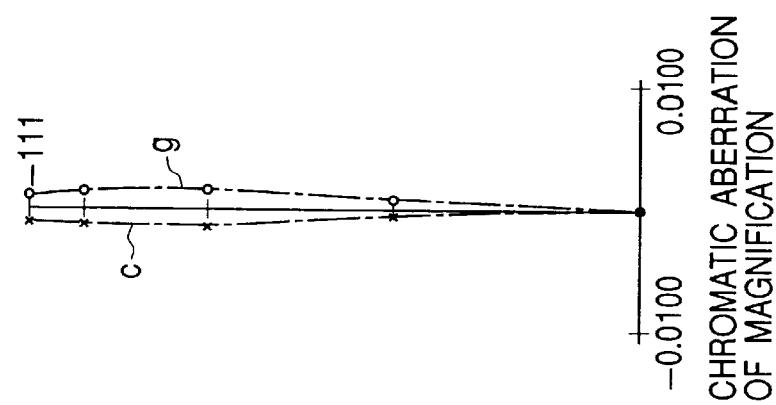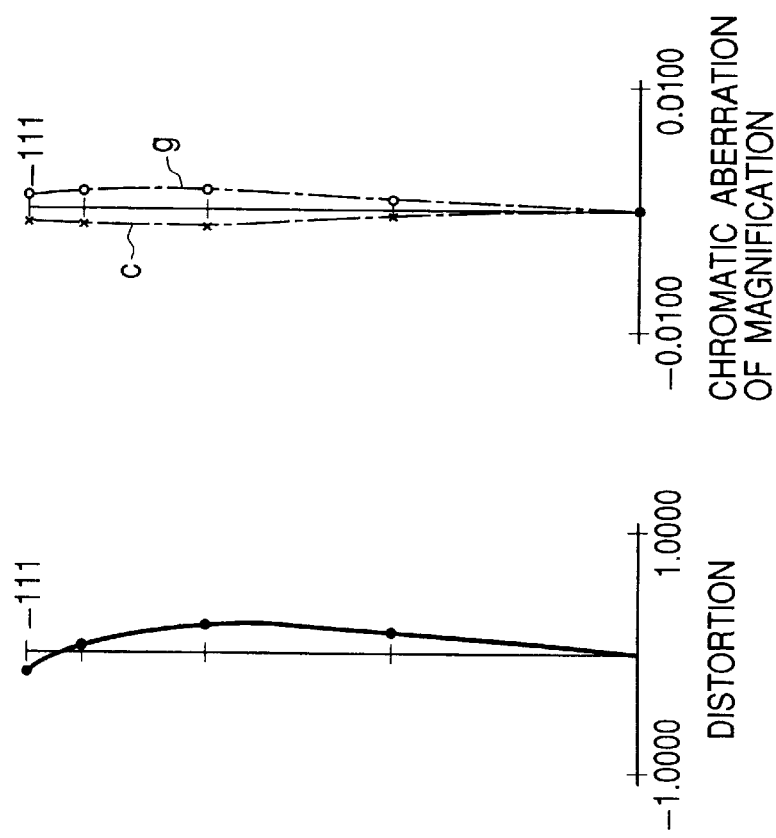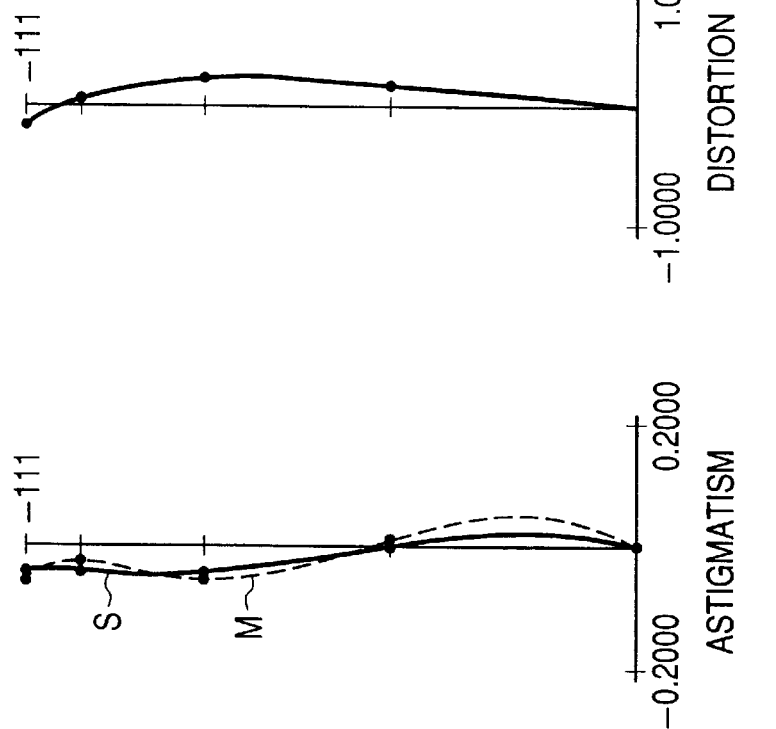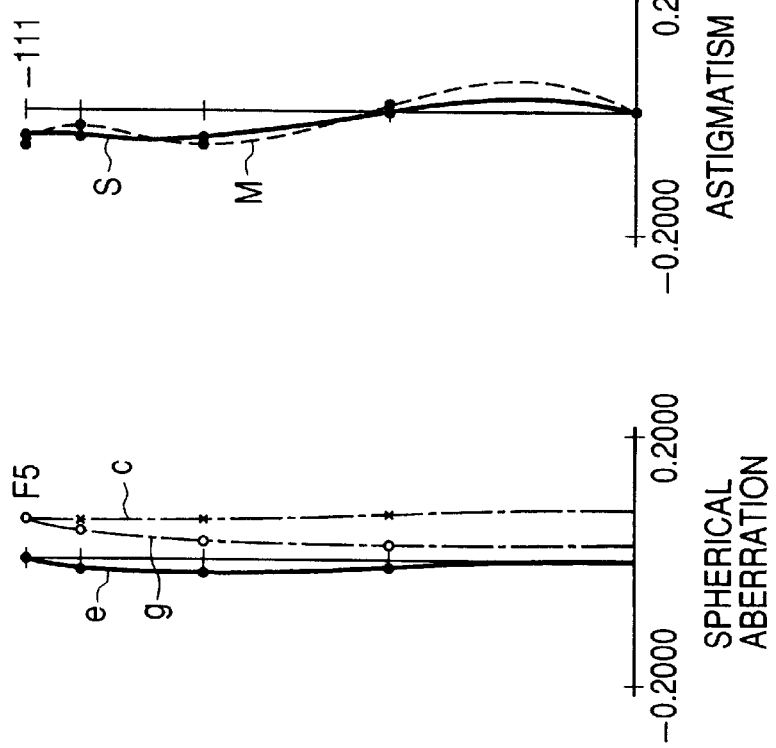

COLOR IMAGING READING APPARATUS

BACKGROUND OF THE INVENTION

1. Field of the Invention

This invention relates to a color image reading apparatus and, more particularly, it relates to an apparatus adapted to form a color image of an original laid on an original supporting plane on at least three line sensors by means of an imaging optical system comprising an anamorphic lens and reading image data from the obtained color image. A color image reading apparatus according to the invention can find applications in image scanners, digital copying machines, facsimile machines and other apparatus.

2. Related Background Art

In a known flat-bed type image scanner as disclosed in Japanese Patent Application Laid-Open No. 3-113961, an imaging lens and a line sensor are rigidly held in position so that the surface of the original is exposed to light through a slit and image data are read from the original by driving only a plurality of reflecting mirrors in a scanning direction. In recent years, there have been proposed various carriage type image reading apparatus comprising a plurality of mirrors, imaging lenses and line sensors that are integrally combined to scan an original.

FIG. 1 of the accompanying drawings schematically illustrates a principal portion of a known carriage type image reading apparatus.

Referring to FIG. 1, the light beam emitted from a light source 701 is made to irradiate original 708 directly or by way of a reflecting hood 709 and the path of the light beam reflected from the original 708 placed on an original supporting glass panel 702 is folded within carriage 706 by means of first, second, third and fourth reflecting mirrors 703a, 703b, 703c and 703d before the light beam is focussed by an imaging lens 704 on a linear image sensor 705 such as a CCD (charge coupled device, to be referred to simply as CCD hereinafter). Image data are read from the original 708 by driving the carriage 706 in the direction of arrow A (sub-scanning direction) by means of a sub-scanning motor 707. In FIG. 1, the CCD 705 is formed by arranging a plurality of light receiving elements (pixels) in a one-dimensional direction (main-scanning direction).

The carriage 706 has to be down-sized if the image scanner having the above described configuration is to be down-sized. The carriage 706 may be down-sized by increasing the number of reflecting mirrors it contains and/or by using a single mirror to reflect the light beam for a number of times in order to secure a required length for the path of the light beam.

However, the above described techniques for down-sizing the carriage tend to make the internal structure of the carriage 706 highly complex and hence it is very difficult with any of such techniques to secure the level of precision required when assembling the apparatus. Then, the cost of precisely assembling the apparatus will inevitably be high. Additionally, the imaging performance of the apparatus will be degraded as a function of the planar precision of the reflecting mirror(s) and the number of times of reflection that occurs in the optical imaging system. It may be needless to say that a poor imaging performance adversely affects the image read by the apparatus.

On the other hand, the distance between the object to be imaged and the image formed by the imaging optical system can be reduced by using a wide angle lens for the imaging lens (imaging system) 704. As a matter of facts, various imaging systems that can be realized by using a practically feasible number of wide angle lenses having a spherical surface have hitherto been proposed. However, the half angle of view of such lenses is 25 degrees at most and the problem of field curvature and that of astigmatism can become remarkable to make it difficult for them to perform optically satisfactorily if a wider angle is used.

In view of these circumstances and as result of intensive research efforts, the applicant of the present patent application succeeded in dissolving the above problems by introducing an anamorphic lens having at least a surface that shows rotational asymmetry relative to the optical axis into the imaging system. This technique is disclosed in Japanese Patent Application Laid-Open No. 2000-171705 filed by the applicant of the present patent application.

On the other hand, there have also been proposed various color image reading apparatus adapted to form a color image of an original on at least three line sensors by means of an imaging optical system comprising an anamorphic lens and reading image data from the obtained color image. Since such a color image reading apparatus reads different sets of color data sequentially by means of at least three line sensors, there can arise occasions where any of the line sensors fails to read a same line on the original to consequently give rise to color separation in the obtained image. Particularly, if the imaging lens system is compactly configured, the obtained image can be distorted to give rise to discrepancies among the color data read by the different line sensors. While the discrepancies among the color data read by the different line sensors can be electrically corrected in the direction along which the pixels of each line sensor are arranged (main-scanning direction) by making use of the locations of the pixels, it is difficult to significantly correct the discrepancies in a direction perpendicular to the direction of arrangement of the pixels of the line sensors (sub-scanning direction) because of the volume of the data that have to be corrected.

Additionally, when an anamorphic lens is incorporated into an imaging optical system, the image forming performance of the imaging optical system is rotationally asymmetric relative to the optical axis of the system due to the influence of the anamorphic surface. Then, it is necessary to define the rotational phase of the anamorphic lens relative to the lense barrel.

SUMMARY OF THE INVENTION

Therefore, it is an object of the present invention to provide a color image reading apparatus that can read a color image without color separation in the sub-scanning direction by minimizing the distortion of the imaging lens unit.

Another object of the present invention is to provide a color image reading apparatus adapted to read a color image with an enhanced precision level by exploiting the optical potential of the imaging lens unit both in the main-scanning direction and in the sub-scanning direction.

According to the invention, the above objects are achieved by providing a color image reading apparatus comprising:

at least three line sensors arranged at predetermined intervals in the sub-scanning direction perpendicular to the main-scanning direction, each having a plurality of light receiving pixels arranged in the main-scanning direction;

an imaging optical system for forming a color image of an original laid on an original supporting plane on said line sensors, said imaging optical system including at least an anamorphic lens; and a drive means for driving said original and said line sensors relative to each other in the sub-scanning direction;

said apparatus satisfying the requirement expressed by formula below:

$$|Dis(s)|<0.25 \cdot W/S_0,$$

where $S_0$ is the distance separating adjacently located line sensors, W is the width of the light receiving pixels in the sub-scanning direction and Dis(s) is the distortion component of said imaging optical system in the sub-scanning direction.

BRIEF DESCRIPTION OF THE DRAWINGS

FIGS. 9A, 9B, 9C and 9D are graphs showing various aberrations of the imaging lens unit of Embodiment 2 using the values of Numerical Example 2.

DESCRIPTION OF THE PREFERRED EMBODIMENTS

Figure 1:
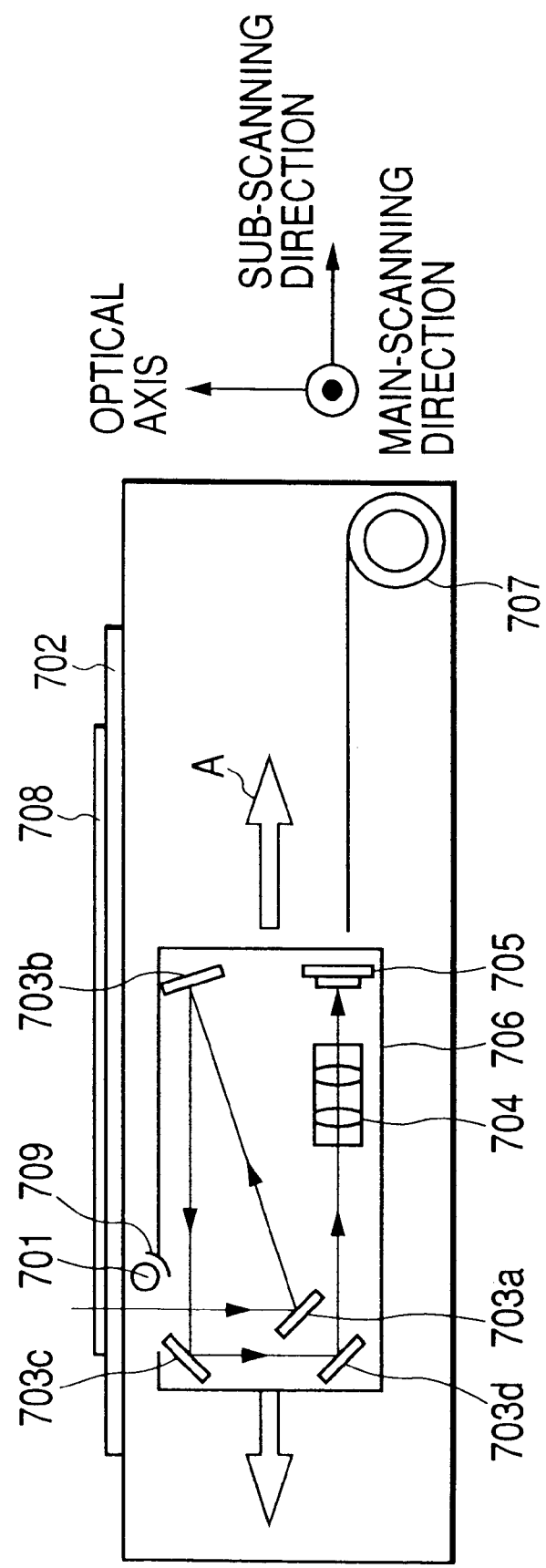
FIG. 1 is a schematic view of a known image reading apparatus, illustrating a principal part thereof.
Figure 2:
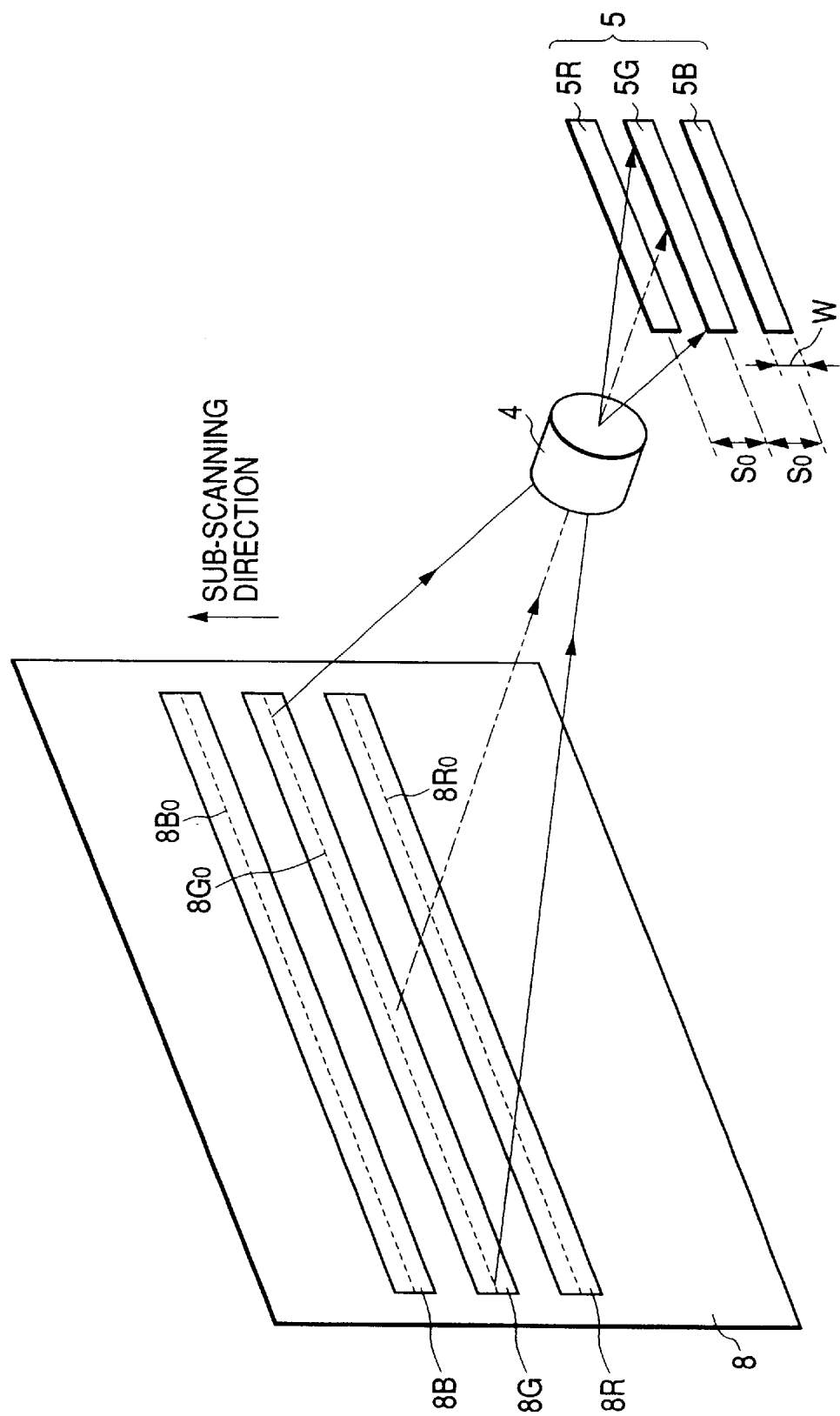
FIG. 2 is a schematic perspective view of the optical system of a color image reading apparatus according to the invention, illustrating its basic configuration.
Figure 3:
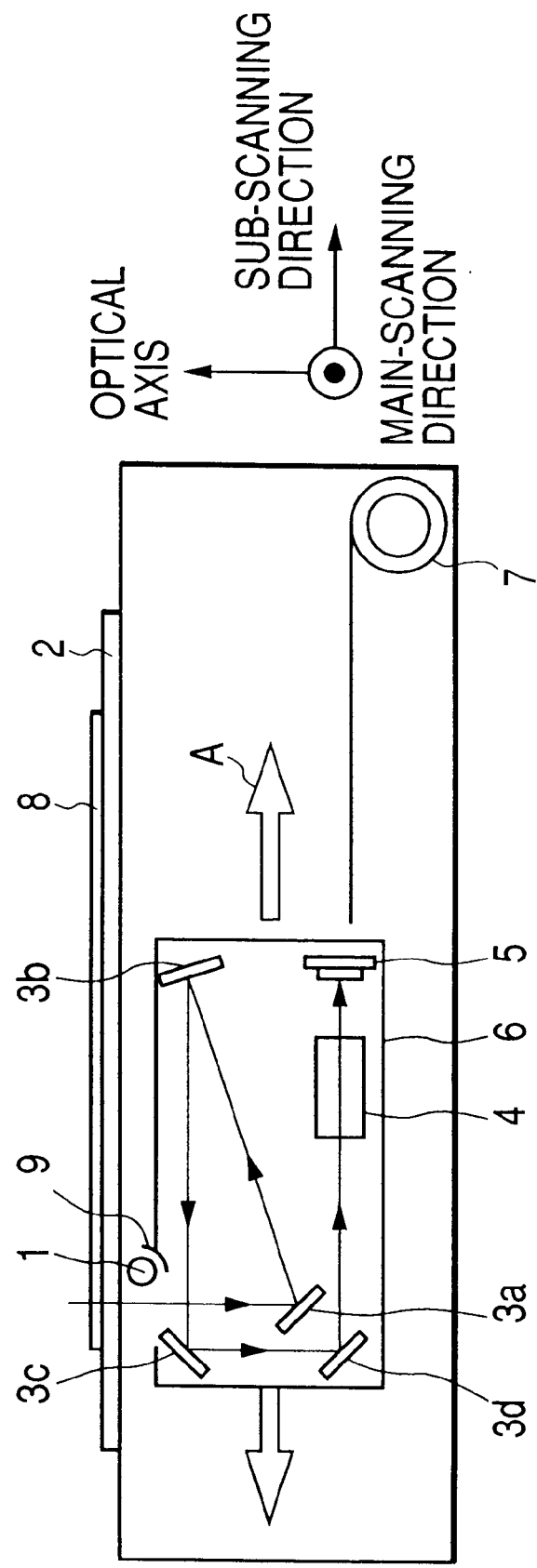
FIG. 3 is a schematic view of a color image reading apparatus according to the invention, illustrating a principal part thereof.

FIG. 2 is a schematic perspective view of the optical system of a color image reading apparatus according to the invention, illustrating its basic configuration and FIG. 3 is a schematic view, illustrating a principal part, of a color image reading apparatus according to the invention, which is applicable to a color image forming apparatus such as an image sensor or a copying machine.

Reference symbol 8 in FIG. 2 denotes an original which provides a color image. Reference symbols 8R, 8G and 8B denote respective scopes of reading on the original 8 that are conjugate respectively with line sensors (CCDs) 5R, 5G and 5B, which will be described hereinafter. Reference symbol 4 denotes an imaging lens unit including an anamorphic lens having at least a surface rotationally asymmetric relative to the optical axis of the apparatus. The imaging lens is adapted to focus the light beam conveying image data from the original 8 onto the surface of reading means 5, which is formed by arranging three line sensors 5R, 5G and 5B in parallel with each other on the surface of a single substrate, thus being of so-called monolithic type. Each of the line sensors has a plurality of light receiving pixels arranged in the main-scanning direction. The line sensors are provided with respective color filters (not shown) specific to their sensing colors (e.g., red (R), green (G), blue (B)) that are arranged on their surfaces. The line sensors 5R, 5C and 5B have a same width W and arranged at regular intervals $S_0$. More specifically, each of the line sensors 5R, 5G and 5B is comprised of light receiving pixels having a width W as viewed in the sub-scanning direction and arranged in parallel with each other with a spacing $S_0$ therebetween. The three line sensors are adapted to sequentially read respective sets of color data that are different from each other (i.e. R, G and B).

In FIG. 3, the components same as those of FIG. 2 are denoted respectively by the same reference symbols. Referring to FIG. 3, reference symbol 2 is an original supporting glass panel, on the surface of which an original 8 is placed. Reference symbol 6 denotes a carriage (unit) containing a light source 1, a reflecting hood 9, a plurality of reflecting mirrors 3a, 3b, 3c and 3d, an imaging lens unit 4 and reading means 5 as integral components thereof. It is driven by a drive unit such as a sub-scanning motor 7 in the sub-scanning direction (as indicated by arrow A in FIG. 3) to scan the original 8 and read image data therefrom. Reference symbol 1 denotes a light source which may be a fluorescent lamp or a halogen lamp. Reference symbol 9 denotes a reflecting hood for reflecting the light beam from the light source 1 in order to efficiently irradiate the original 8 with light. Reference symbols 3a, 3b, 3c and 3d denotes respectively first, second, third and fourth reflecting mirrors for folding the light path of the light beam from the original 8 within the carriage 6.

Referring to FIG. 3, the light beam emitted from the light source 1 irradiates the original 8 directly or after being reflected by the reflecting hood 9. The light beam reflected by the original 8 is focussed on the three line sensors 5 by the imaging lens unit 4. Note that the light path of the light beam from the original 8 is folded by the first, second, third and fourth reflecting mirrors 3a, 3b, 3c and 3d. Image data are read from the original 8 as the carriage 6 is driven in the direction of arrow A (sub-scanning direction) by the sub-scanning motor 7.

The carriage of the image reading apparatus of FIG. 3 is adapted to scan the original 8 that is held stationary. The scanning operation of the carriage is equivalent to a reciprocating motion of the original relative to the three line sensors 5 and the imaging lens unit 4 that are held stationary. As the carriage 6 scans the original 8, a same spot on the original is read with different colors at temporal intervals. If the imaging lens unit 4 shows distortions, the linear images formed on the line sensors 5B and 5R will be distorted ones.

Figure 4:
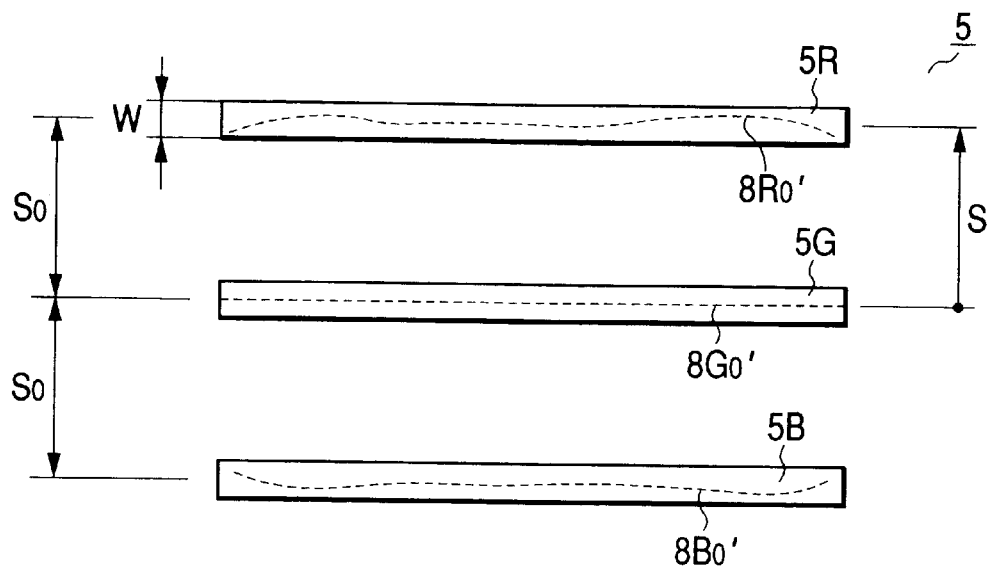
FIG. 4 is schematic illustration of distortions of linear images on the surfaces of line sensors

FIG. 4 is schematic illustration of distortions of linear images on the surfaces of line sensors. In FIG. 4, images of dotted lines $8R_0'$, $8G_0'$ and $8B_0'$ are formed respectively on the corresponding line sensors 5R, 5G and 5B. Distortions can appear when the angle of view is raised. Therefore, the images of the lines formed on the surfaces of the line sensors can show large distortions when the original supporting plane and the line sensors are separated from each other by a short distance to give rise to a large angle of view. When the distortions of the images of the lines are large, the final image obtained by laying the images of the different colors one on the other to reproduce the original can show a remarkable color separation. From experience, it is known that the color separation should be confined to less than 0.25 of the width of the line sensors (the width of the light receiving pixels in the sub-scanning direction).

When the imaging lens includes an anamorphic lens, the aberration differs between the main-scanning direction and the sub-scanning direction of each line sensor. Therefore, the distortion of the imaging lens should be minimized both in the main-scanning direction and in the sub-scanning direction. Particularly, the distortion in the sub-scanning direction should be suppressed because it can hardly be electrically corrected.

If the distance separating the central line censor 5G of the three line sensors 5 from the other two line sensors 5R and 5B is $S_0$ and the distance separating one of the line sensors from the remaining line sensors in terms of the linear image of a line on the original 8 formed by the imaging lens unit 4 is S, the distortion component Dis(s) of the imaging lens unit 4 in the sub-scanning direction is expressed by formula (1) below.

$$\text{Dis}(s) = (S - S_0)/S_0 \qquad (1)$$

If the width of the line sensors is W (as viewed in the sub-scanning direction), the color separation of the different colors should be limited to 0.25 of the width of the line sensors. In other words, the requirement of formula (2) below should be met.

$$|(S - S_0)/W| < 0.25 \qquad (2)$$

From formulas (1) and (2), the color separation of the different colors is minimized when the requirement of formula (3) below is met.

$$|\text{Dis}(s)| < 0.25 \cdot W/S_0 \qquad (3)$$

Thus, according to the invention, the distortions of linear images are minimized by designing the imaging lens unit 4 including an anamorphic lens of a color image reading apparatus so as to meet the requirement of formula (3).

Figure 5:
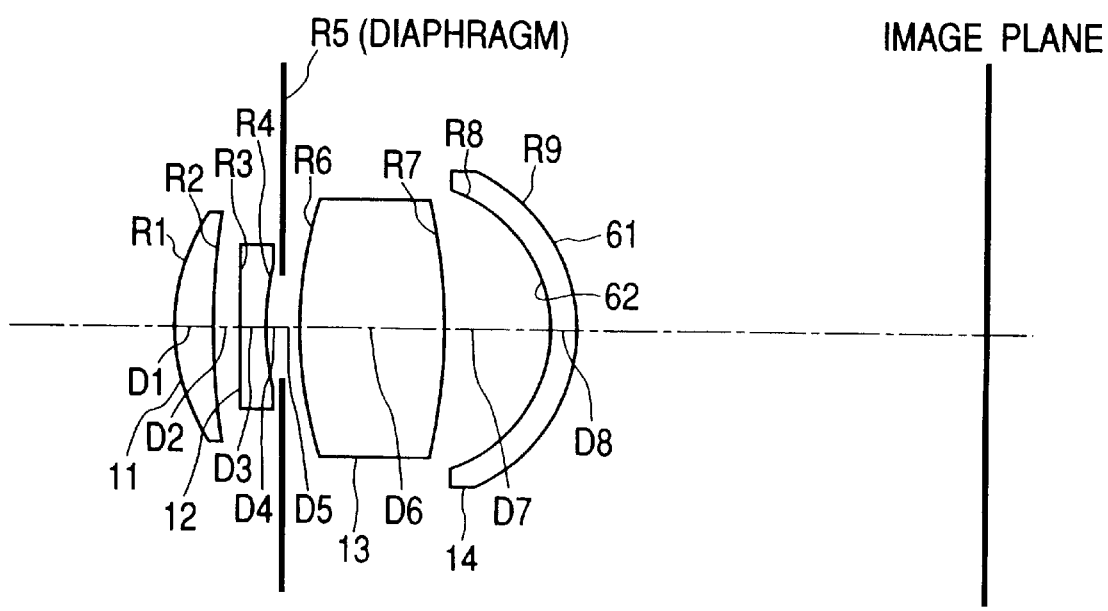
FIG. 5 is a schematic cross sectional view of the imaging lens unit of Embodiment 1 showing the values of Numerical Example 1.
Figure 6:
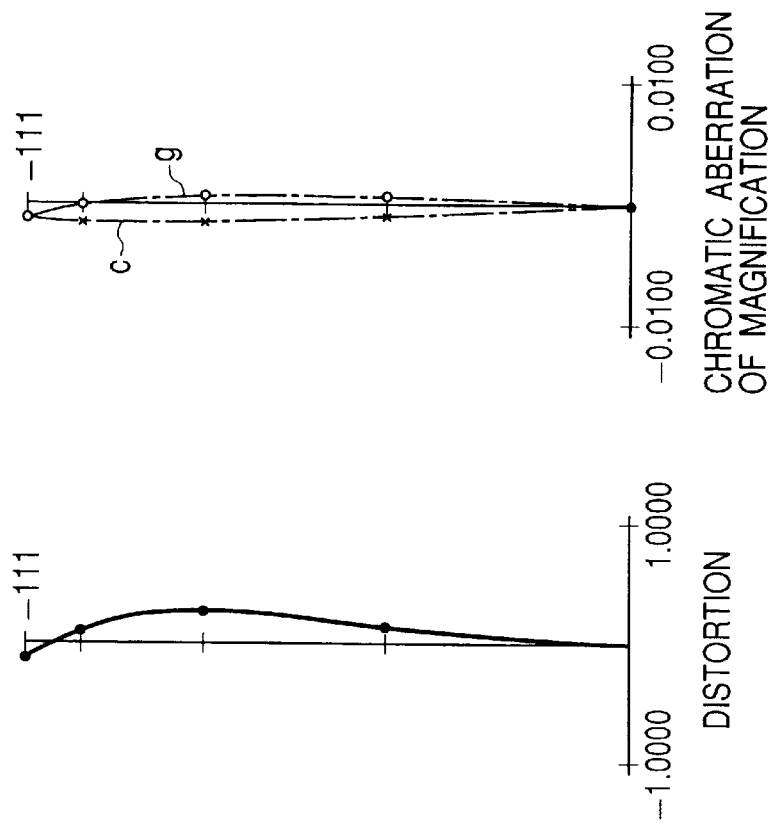
FIGS. 6A, 6B, 6C and 6D are graphs showing various aberrations of the imaging lens unit of Embodiment 1 using the values of Numerical Example 1.
Figure 8:
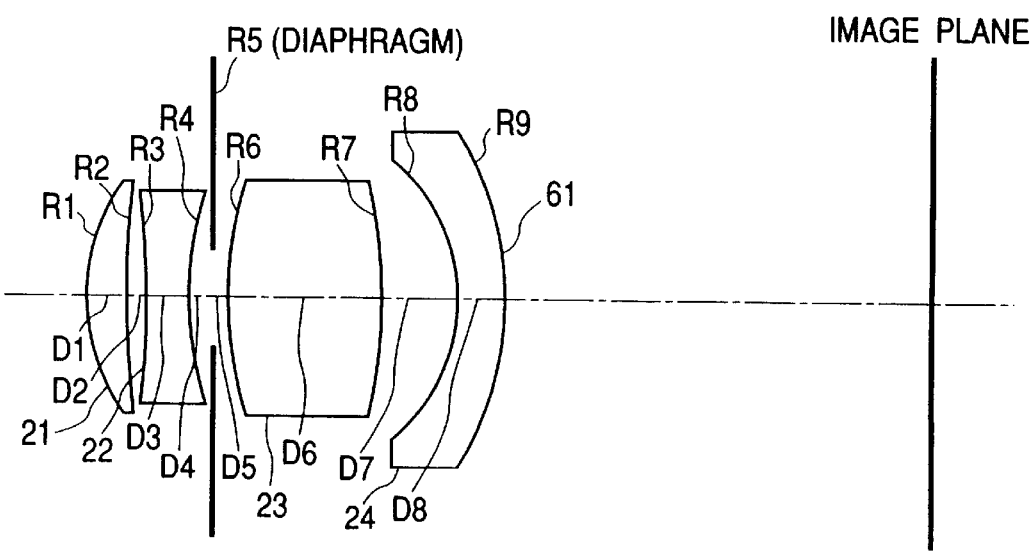
FIG. 8 is a schematic cross sectional view of the imaging lens unit of Embodiment 2 showing the values of Numerical Example 2.
Figure 11:
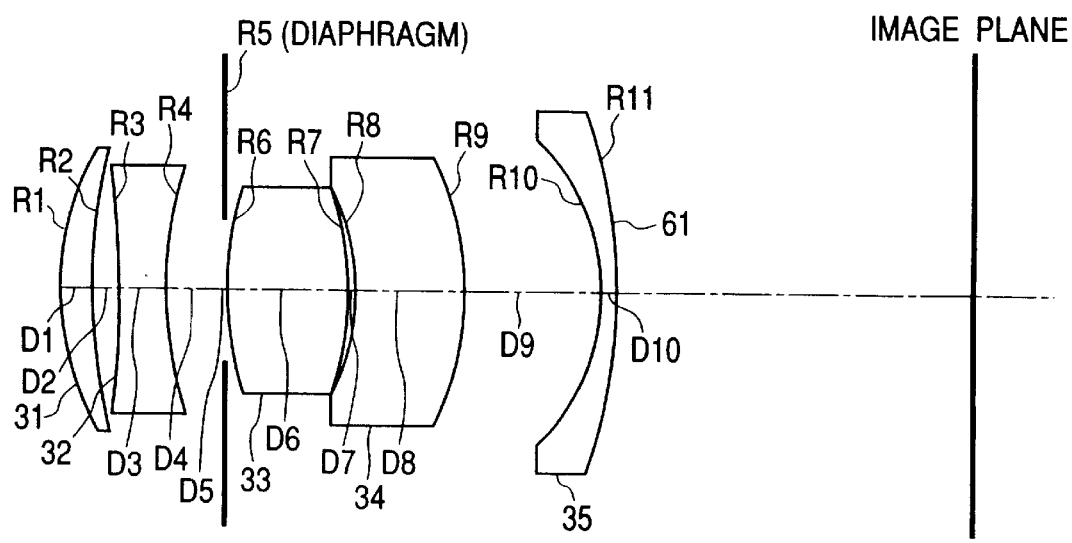
FIG. 11 is a schematic cross sectional view of the imaging lens unit of Embodiment 3 showing the values of Numerical Example 3.
Figures 12A, 12B, 12C, 12D:
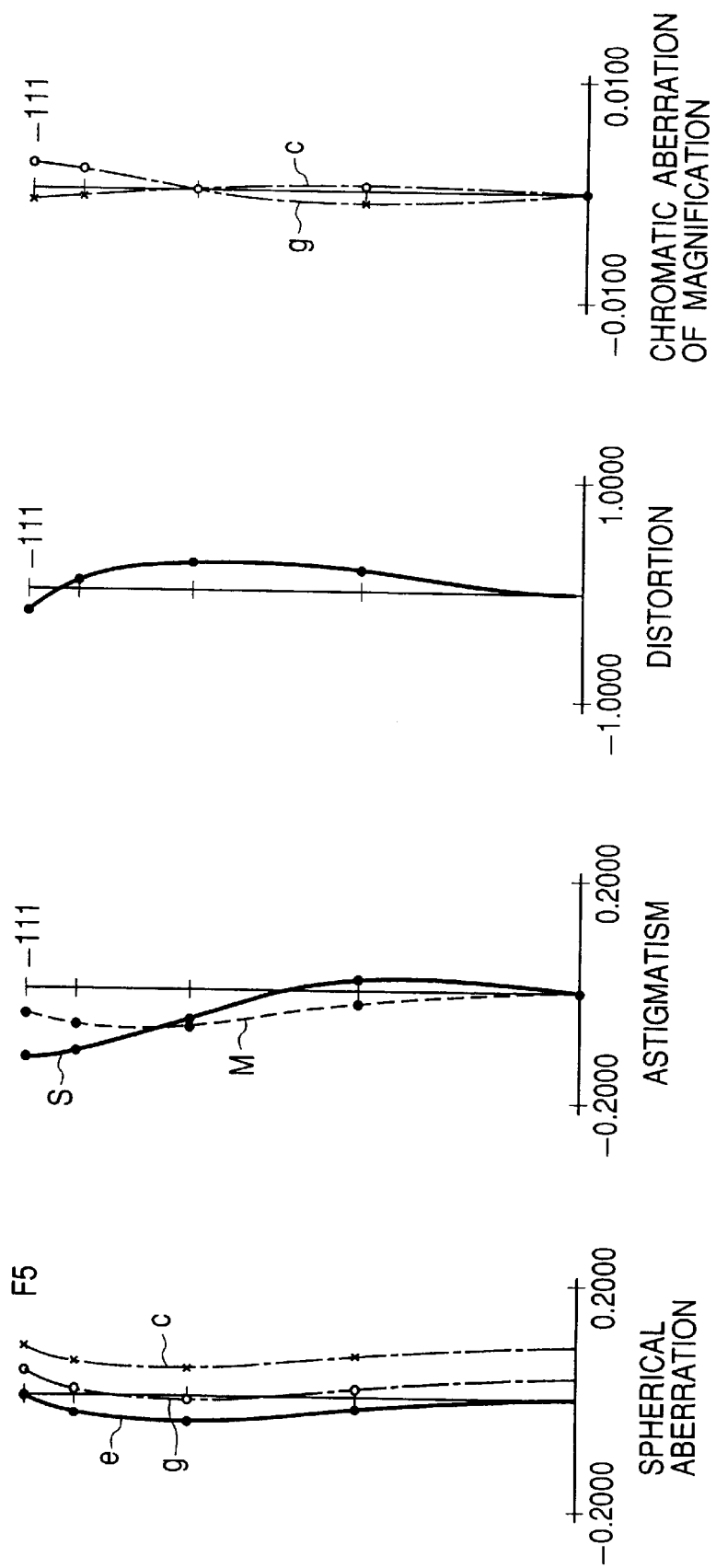
FIGS. 12A, 12B, 12C and 12D are graphs showing various aberrations of the imaging lens unit of Embodiment 3 using the values of Numerical Example 3.

FIGS. 5, 8 and 11 are schematic cross sectional views of the imaging lens units of Embodiments 1, 2 and 3 realized by using respectively the values of Numerical Examples 1, 2 and 3, which will be described hereinafter. FIGS. 6A through 6D, 9A through 9D and 12A through 12D are graphs showing various aberrations of the imaging lens units of Embodiments 1, 2 and 3 using the values of Numerical Examples 1, 2 and 3 respectively.

The imaging lens unit realized by using Numerical Example 1 is of telephoto type and comprises four lenses of a positive first lens 11, a negative second lens 12, a positive third lens 13 and a negative fourth lens 14 arranged in the above mentioned order as viewed from the object (original) side with a stop (diaphragm) arranged between the negative second lens 12 and the positive third lens 13. Similarly, the imaging lens unit realized by using Numerical Example 2 is also of telephoto type and comprises four lenses of a positive first lens 21, a negative second lens 22, a positive third lens 23 and a negative fourth lens 24 arranged in the above mentioned order as viewed from the object (original) side with a stop arranged between the negative second lens 22 and the positive third lens 23. The imaging lens unit realized by using Numerical Example 3 is also of telephoto type and comprises fives lenses of a positive first lens 31, a negative second lens 32, a positive third lens 33, a negative fourth lens 34 and a negative fifth lens 35 arranged in the above mentioned order as viewed from the object (original) side with a stop arranged between the negative second lens 32 and the positive third lens 33.

In the case of using Numerical Example 1, the negative fourth lens 14 is an anamorphic lens, one of the surfaces (lens surface R9 facing the image) of which is rotationally asymmetric relative to the optical axis while the other surface (lens surface R8 facing the original) is an aspheric surface that is rotationally symmetric relative to the optical axis. In the case of using Numerical Example 2, the negative fourth lens 24 is an anamorphic lens, one of the surfaces (lens surface R9 facing the image) of which is rotationally asymmetric relative to the optical axis. In the case of using Numerical Example 3, the negative fifth lens 35 is an anamorphic lens, one of the surfaces (lens surface R11 facing the image) of which is rotationally asymmetric relative to the optical axis. A surface of a lens that is rotationally asymmetric relative to the optical axis is referred to as anamorphic surface hereinafter.

In each of Numerical Examples 1, 2 and 3, the radius of curvature of the major axis and that in the minor axis of the anamorphic surface 61 are made to agree with each other on the optical axis but differentiated as a function of the distance from the optical axis. By using such a surface profile, the sagittal image surface and the meridional image surface can be designed independently relative to each other so that the astigmatism can be dissolved for any angle of view and at the same time, the distortions in the main-scanning direction and in the sub-scanning direction can be corrected independently.

Figure 7:
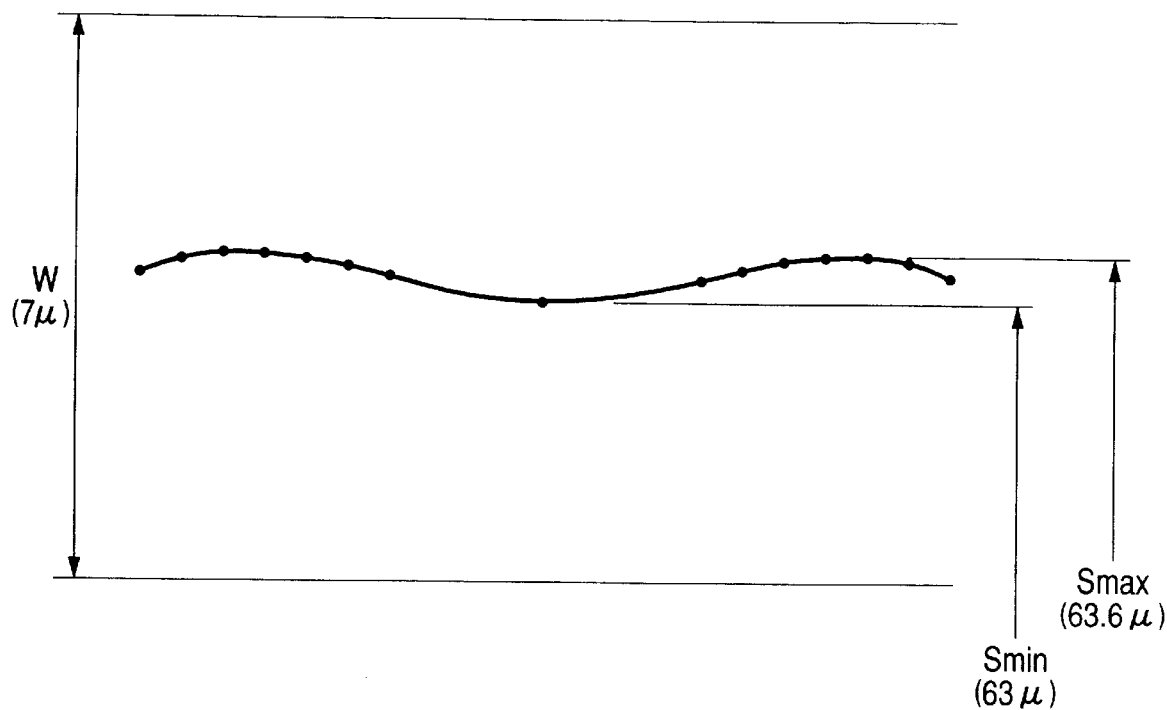
FIG. 7 is a graph illustrating the image distortion of Embodiment 1 in the sub-scanning direction.
Figure 10:
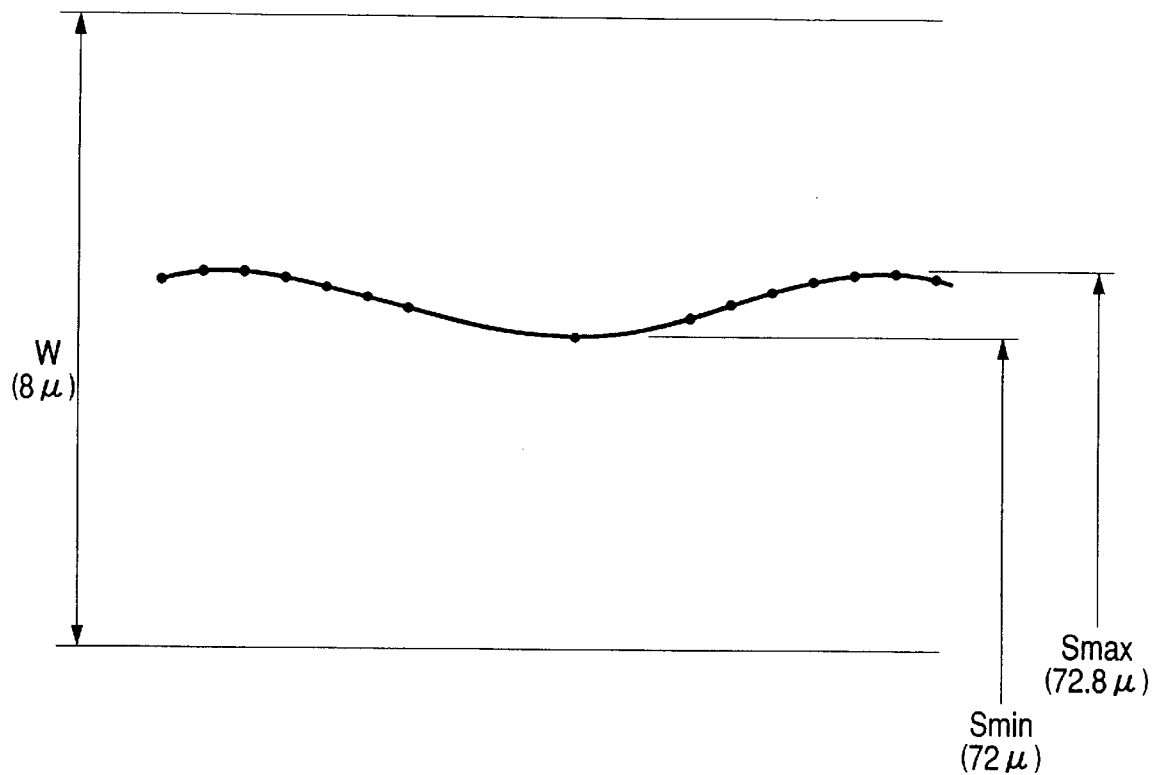
FIG. 10 is a graph illustrating the image distortion of Embodiment 2 in the sub-scanning direction.
Figure 13:
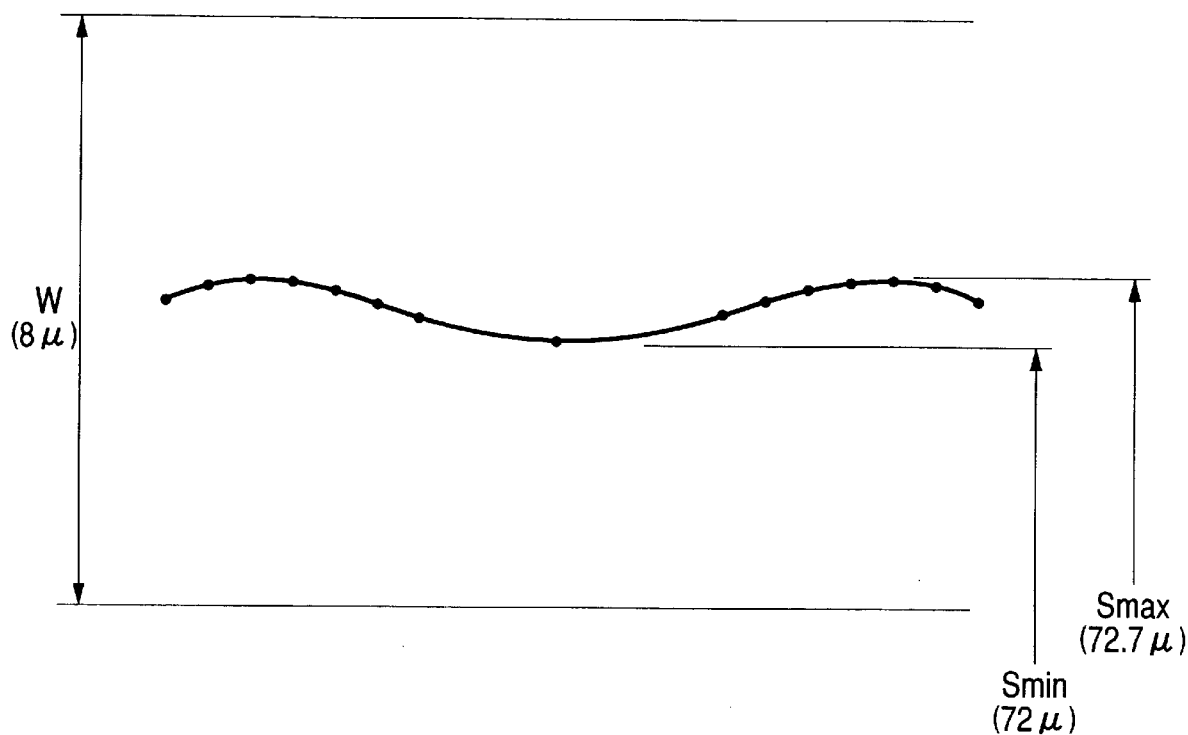
FIG. 13 is a graph illustrating the image distortion of Embodiment 3 in the sub-scanning direction.

FIGS. 7, 10 and 13 are graphs illustrating the linear images formed on respective line sensors located at an end in Embodiments 1, 2 and 3. In FIG. 7, the linear image is obtained with W=7 $\mu$m and S=63 $\mu$m. In FIGS. 10 and 13, the both linear images are obtained with W=8 $\mu$m and S=72 $\mu$m. The distortion component |Dis(s)| of the imaging lens is 0.01 in each of Embodiments 1, 2 and 3 to evidence that the requirement of formula (3) is met. As seen from FIGS. 7, 10 and 13, the images of the lines in each of Embodiments 1, 2 and 3 are practically straight to ensure that the final image to be read is free from color separation.

In each of Embodiments 1, 2 and 3, the profile (major axis profile X and minor axis profile S) of the anamorphic surface 61 of the anamorphic lens (14, 24 or 35) facing the image plane is expressed by formulas (4) and (5) as will be described hereinafter. The profile of the aspherical surface 62 of the anamorphic lens 14 is expressed by formula (6) as will be described hereinafter.

The major axis profile X of an anamorphic surface that corresponds to the main-scanning direction is expressed by formula (4) below provided that the point of intersection of the lens surface and the optical axis is selected as original point and the x-axis represents the direction of the optical axis while the y-axis is the axis perpendicular to the optical axis in the main-scanning cross section and the z-axis is the axis perpendicular to the optical axis in the sub-scanning cross section;

$$X = \frac{y^2/R}{1 + (1 - (1+k_y)(y/R))^{1/2}} + B_4 y^4 + B_6 y^6 + B_8 y^8 + B_{10} y^{10}, \quad (4)$$

where R is the radius of curvature and $k_y$, $B_4$, $B_6$, $B_8$ and $B_{10}$ are so many aspheric coefficients.

On the other hand, the minor axis profile S of an anamorphic surface that corresponds to the sub-scanning direction is expressed by formula (5) below;

$$S = \frac{z^2/r'}{1 + (1 - (z/r'))^{1/2}}, \quad (5)$$

where $r' = r_0(1 + D_2 y^2 + D_4 y^4 + D_6 y^6 + D_8 y^8 + D_{10} y^{10})$, $r_0$ being the radius of curvature of the minor axis on the optical axis, $D_2$, $D_4$, $D_6$, $D_8$ and $D_{10}$ being so many aspheric coefficients.

The aspheric profile X is expressed by formula (6) below;

$$X = \frac{h^2/R}{1 + (1 - (1+k)(h/R^2))^{1/2}} + B_4 h^4 + B_6 h^6 + B_8 h^8 + B_{10} h^{10}, \quad (6)$$

where R is the radius of curvature and k, $B_4$, $B_6$, $B_8$ and $B_{10}$ are so many aspheric coefficients, while h is the surface height in the direction perpendicular to the optical axis.

Thus, in each of Embodiments 1, 2, and 3, a compact carriage can be realized by using an imaging lens unit formed with the values of Numerical Example 1, 2 or 3 for an image forming apparatus such as image scanner or digital copying machine. Such a carriage can raise the speed at which a color image is formed without distortions.

While the three line sensors of each of Embodiments 1, 2 and 3 are those adapted to read respective images in one of the three primary colors of R, G and B, the present invention is by no means limited to such line sensors. For example, four line sensors including one for reading an image in black and white or an image with infrared rays may alternatively be used.

Numerical Examples 1, 2 and 3 used for the imaging lens units of Embodiments 1, 2 and 3 are listed below. In the examples listed below, Ri is the radius of curvature of the i-th lens surface as counted from the object and Di is the thickness of the i-th lens or air gap as counted from the object, while Ndi and νdi are respectively the refractive index for the d line and the Abbe's number of the glass of the i-th lens as counted from the object. Symbol fe is the focal length of the e line and $F_{NO}$ is the F number, while ω is the half angle of view and m is the imaging magnification. Symbols e, g, and C in the graphs showing various aberrations represent the aberrations relative to the e line, the g line and the C line respectively, while S and M represents the aberration of the sagittal image surface and that of the meridional image surface respectively. For an aspheric surface, coefficients of the aspheric surface are shown while for an anamorphic surface, coefficients of the anamorphic surface are shown.

NUMERICAL EXAMPLE 1

| fe = 28.94 mm | FNO = 1:5.0 | 2ω = 57.1° | m = −0.165 |
|---|---|---|---|
| | original worth = 222 | | |
| R1 = 9.798 | D1 = 1.80 | $N_d 1$ = 1.7725 | $ν_d 1$ = 49.6 |
| R2 = 32.531 | D2 = 1.43 | | |
| R3 = −83.772 | D3 = 1.00 | $N_d 2$ = 1.72151 | $ν_d 2$ = 29.2 |
| R4 = 11.750 | D4 = 0.66 | | |
| R5 = (diaphragm) | D5 = 0.95 | | |
| R6 = 24.462 | D6 = 6.66 | $N_d 3$ = 1.7725 | $ν_d 3$ = 49.6 |
| R7 = −33.061 | D7 = 4.90 | | |
| R8 = −6.567 | D8 = 1.14 | $N_d 4$ = 1.53041 | $ν_d 4$ = 55.5 |
| R9 = −8.085 | | | |

| | coefficients of aspheric surface | | |
|---|---|---|---|
| R8 = 6.567 | k = −2.160 × 10⁻¹ | B4 = −9.555 × 10⁻⁵ | B6 = −1.765 × 10⁻⁶ |
| | B8 = 3.462 × 10⁻⁸ | B10 = −5.333 × 10⁻¹⁰ | |

| | coefficients of anamorphic surface | | |
|---|---|---|---|
| R9 = −8.085 | ky = −1.379 × 10⁻¹ | B4 = −2.592 × 10⁻⁵ | B6 = −1.313 × 10⁻⁷ |
| | B8 = 7.835 × 10⁻⁹ | B10 = 1.952 × 10⁻¹⁰ | |
| | D2 = 1.602 × 10⁻³ | D4 = −4.808 × 10⁻⁵ | D6 = 2.895 × 10⁻⁶ |
| | D8 = −6.418 × 10⁻⁸ | D10 = 4.471 × 10⁻¹⁰ | |

NUMERICAL EXAMPLE 2

| fe = 31.27 mm | FNO = 1:5.0 | 2ω = 58.9° | m = −0.189 |
|---|---|---|---|
| | original width = 222 | | |
| R1 = 11.221 | D1 = 1.93 | $N_d 1$ = 1.6968 | $ν_d 1$ = 55.5 |
| R2 = 29.134 | D2 = 1.10 | | |
| R3 = −53.817 | D3 = 2.29 | $N_d 2$ = 1.69895 | $ν_d 2$ = 30.1 |
| R4 = 17.605 | D4 = 1.08 | | |
| R5 = (diaphragm) | D5 = 0.72 | | |
| R6 = 18.792 | D6 = 8.00 | $N_d 3$ = 1.7859 | $ν_d 3$ = 44.2 |
| R7 = −30.984 | D7 = 3.96 | | |
| R8 = −9.089 | D8 = 2.40 | $N_d 4$ = 1.68893 | $ν_d 4$ = 31.1 |
| R9 = −15.363 | | | |

| | coefficients of anamorphic surface | | |
|---|---|---|---|
| R9 = −15.363 | ky = −1.620 × 10⁻¹ | B4 = 3.485 × 10⁻⁵ | B6 = −1.204 × 10⁻⁷ |
| | B8 = 6.437 × 10⁻⁹ | B10 = −3.757 × 10⁻¹¹ | |
| | D2 = 4.301 × 10⁻³ | D4 = −1.045 × 10⁻⁴ | D6 = 6.336 × 10⁻⁶ |
| | D8 = −1.551 × 10⁻⁹ | | |

NUMERICAL EXAMPLE 3

| fe = 30.59 mm | FNO = 1:5.0 | 2ω = 59.9° | m = −0.189 |
|---|---|---|---|
| | original width = 222 | | |
| R1 = 16.201 | D1 = 1.87 | $N_d 1$ = 1.7725 | $ν_d 1$ = 49.6 |
| R2 = 35.993 | D2 = 1.25 | | |
| R3 = −46.836 | D3 = 2.30 | $N_d 2$ = 1.6398 | $ν_d 2$ = 34.5 |
| R4 = 22.827 | D4 = 3.14 | | |
| R5 = (diaphragm) | D5 = 0 | | |
| R6 = 18.418 | D6 = 6.27 | $N_d 3$ = 1.7725 | $ν_d 3$ = 49.6 |
| R7 = −19.587 | D7 = 0.35 | | |
| R8 = −13.708 | D8 = 5.74 | $N_d 4$ = 1.84666 | $ν_d 4$ = 23.8 |
| R9 = −18.096 | D9 = 7.31 | | |
| R10 = 11.562 | D10 = 1.00 | $N_d 5$ = 1.69895 | $ν_d 5$ = 30.1 |

-continued

| fe = 30.59 mm | FNO = 1:5.0 | 2ω = 59.9° | m = −0.189 |
|---|---|---|---|
| | original width = 222 | | |

R11 = −26.668 coefficients of anamorphic surface

| R10 = −11.562 | ky = 3.680 × 10$^{-1}$ | B4 = −4.154 × 10$^{-6}$ | B6 = 5.351 × 10$^{-8}$ |
|---|---|---|---|
| | B8 = 0 | B10 = 0 | |
| | D2 = −2.630 × 10$^{-3}$ | D4 = 2.820 × 10$^{-5}$ | D6 = −2.267 × 10$^{-7}$ |
| | D8 = 0 | D10 = 0 | |

Now, Embodiment 4 will be described below. In this embodiment, a groove is formed in a inner diametrical section of the lens barrel holding the imaging optical system and a projection to be engaged with the groove of the lens barrel is formed at an edge of the anamorphic lens.

Figure 14:
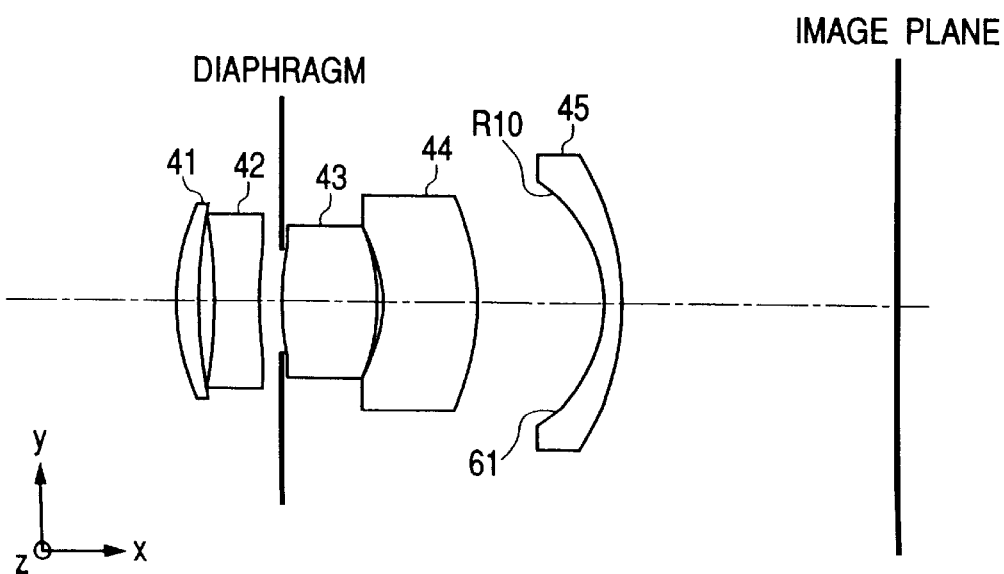
FIG. 14 is a schematic cross sectional view of the imaging lens unit of Embodiment 4 showing the values of Numerical Example 4.
Figures 15A, 15B, 15C, 15D:
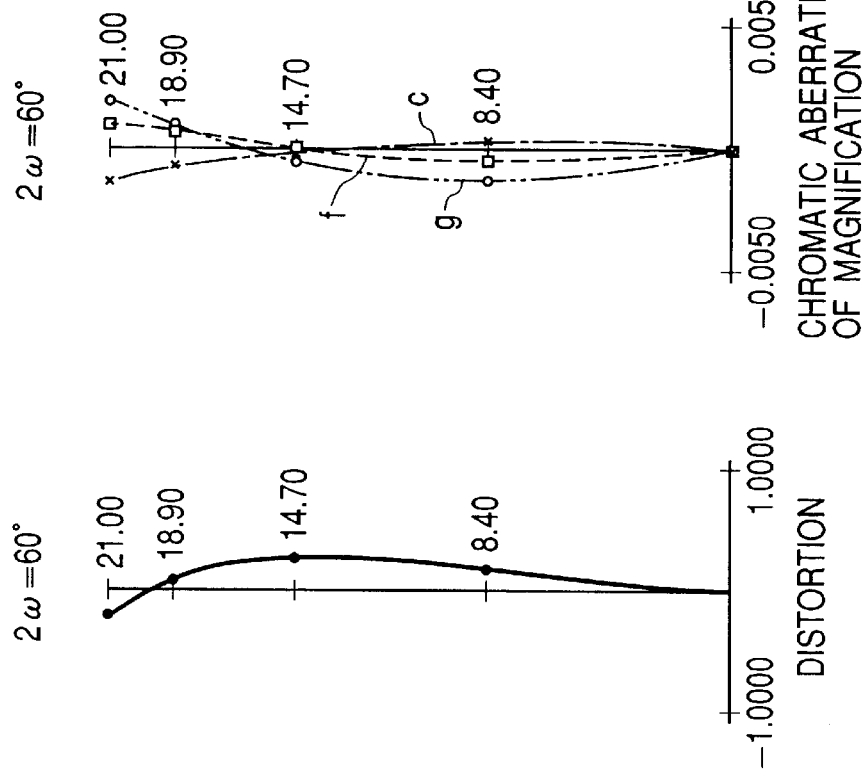
FIGS. 15A, 15B, 15C and 15D are graphs showing various aberrations of the imaging lens unit of Embodiment 4 showing the values of Numerical Example 4.

FIG. 14 is a schematic cross sectional view of the imaging lens unit of Embodiment 4 showing the values of Numerical Example 4. FIGS. 15A through 15D are graphs showing various aberrations of the imaging lens unit of Embodiment 4 showing the values of Numerical Example 4. The imaging lens unit of FIG. 14 realized by using Numerical Example 4 is of telephoto type and comprises five lenses of a positive first lens 41, a negative second lens 42, a positive third lens 43, a negative fourth lens 44 and a negative fifth lens 45 arranged in the above mentioned order as viewed from the object (original) with a stop arranged between the negative second lens 42 and the positive third lens 43.

In this embodiment, the negative fifth lens 45 is an anamorphic lens, one of the surfaces (lens surface R10 facing the image) of which is rotationally asymmetric relative to the optical axis. As pointed out earlier, a surface of a lens that is rotationally asymmetric relative to the optical axis is referred to as anamorphic surface.

The profiles (major axis profile X and minor axis profile S) of the anamorphic surface 61 facing the object of the anamorphic lens 45 realized by using Numerical Example 4 are also expressed by formulas (4) and (5) above. As far as the present invention is concerned, the major axis refers to the line of intersection of the x-y plane of the relative coordinate system and a curved surface, whereas the minor axis refers to the line of intersection of the plane perpendicular to the x-y plane and a curved surface.

In the case of using Numerical Example 4, the radius of curvature R of the major axis and the radius of curvature r of the minor axis of the anamorphic surface 61 are made to agree with each other on the optical axis but differentiated as a function of the distance from the optical axis. By using such a surface profile, the sagittal image surface and the meridional image surface can be designed independently relative to each other so that the astigmatism can be dissolved for any angle of view.

As seen from FIGS. 15A through 15D, the various aberrations produced by using Numerical Example 4 are such that it appears as if the meridional image surface is entangled by the sagittal image surface to eliminate the astigmatism. Additionally, the aberrations other than the field curvature and the astigmatism are confined within a practically satisfactory range.

Since the imaging lens unit of this embodiment of image reading apparatus has at least a surface that is provided by an anamorphic lens and rotationally asymmetric relative to the optical axis, the imaging performance of the imaging lens varies as a function of the direction of the anamorphic surface.

Figure 16B:
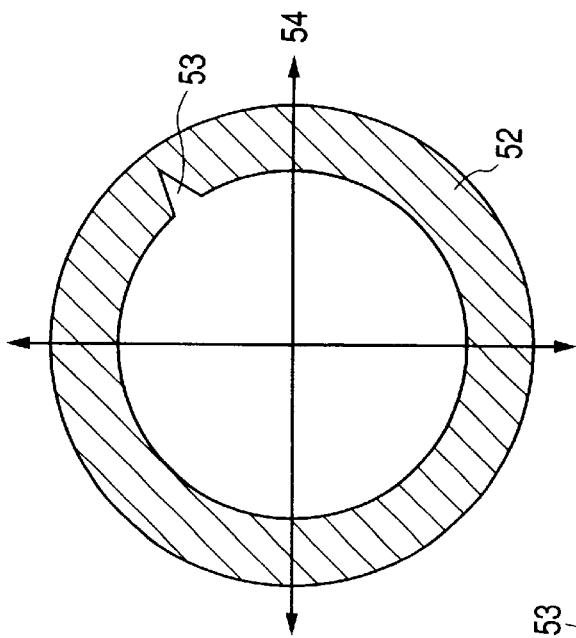
FIGS. 16A, 16B and 16C are illustrations showing the means for delimiting the direction of rotation of the anamorphic lens of Embodiment 4 around the optical axis thereof.
Figure 16C:
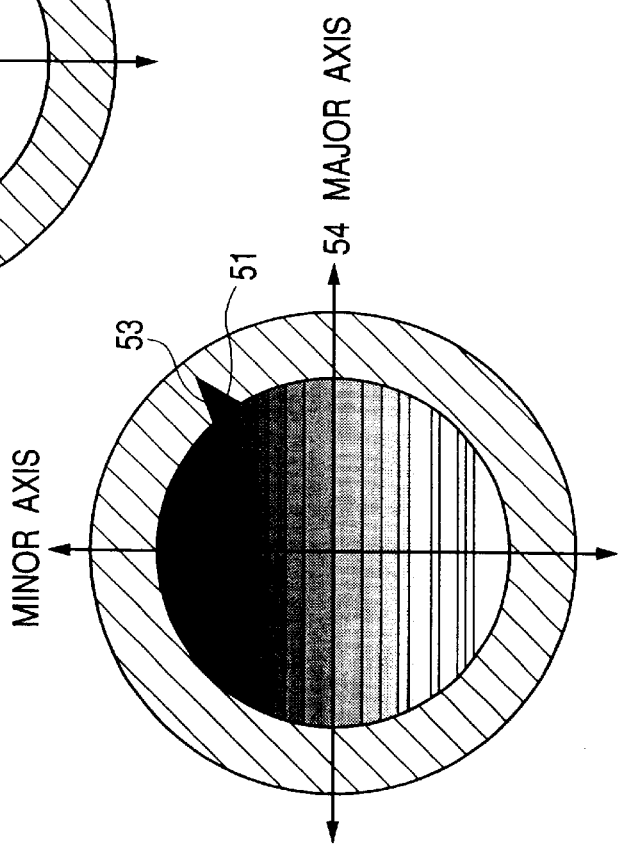
Figure 16A:
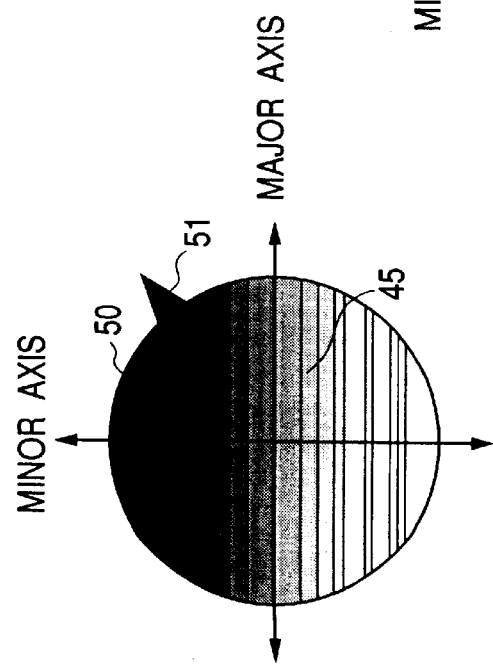

Taking this fact into consideration, in this embodiment, a projection 51 is formed at the edge 50 of the outer periphery of the anamorphic lens 45 with a predetermined axially rotational phase relative to the major axis (or the minor axis) of the lens as shown in FIG. 16A. On the other hand, a groove 53 is formed on the inner periphery of the lens barrel 52 for receiving the anamorphic lens with the predetermined phase relative to the reference direction 54 of the axially rotational phase of the lens barrel (reference direction of the axially rotational phase of the lens barrel relative to the image reading apparatus) as shown in FIG. 16B. Then, the projection 51 and the groove 53 are made to engage with each other as shown in FIG. 16C. With this arrangement, it is now possible to delimit the direction of rotation of the anamorphic lens relative to the lens barrel around the optical axis thereof so that the optical potential of the imaging lens can be fully exploited in terms of the main-scanning direction and the sub-scanning direction. Note that the projection 51 and the groove 53 represent only an example that can be used as engaging means.

The engaging means can delimit the direction of rotation of the anamorphic lens relative to the lens barrel around the optical axis and consequently the optical performance is rendered satisfactory both in the main-scanning direction and in the sub-scanning direction.

While the projection of this embodiment has a triangular cross section, the present invention is by no means limited thereto and it may show any alternative cross section so long as it is snugly engaged with the corresponding groove. For instance, if the projection shows a rectangular cross section, the groove will be made to show a corresponding rectangular cross section.

Figure 17B:
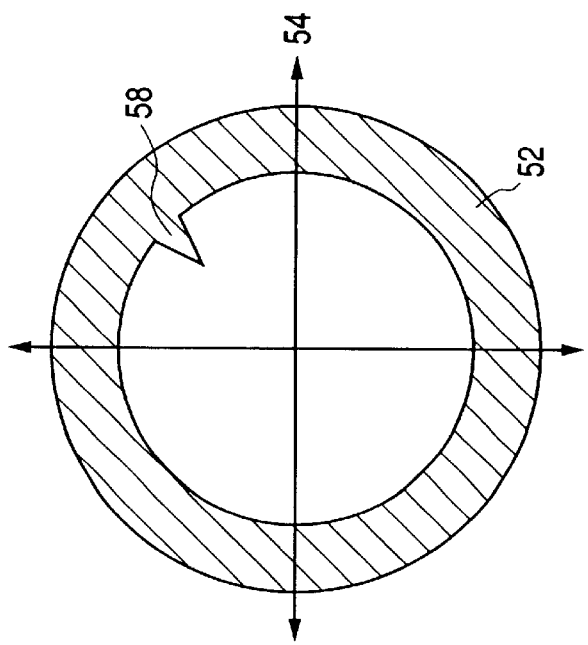
FIGS. 17A, 17B and 17C are illustrations showing the means for delimiting the direction of rotation of the anamorphic lens of Embodiment 5 around the optical axis thereof.
Figure 17A:
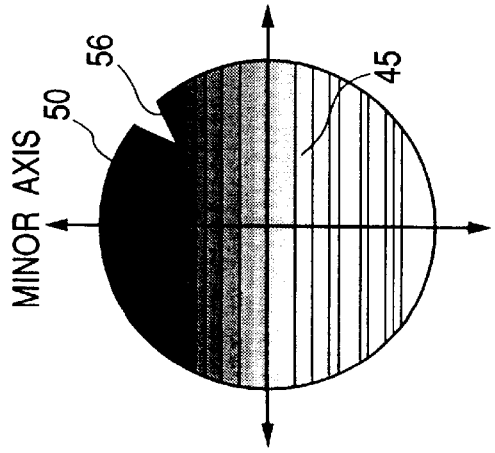
Figure 17C:
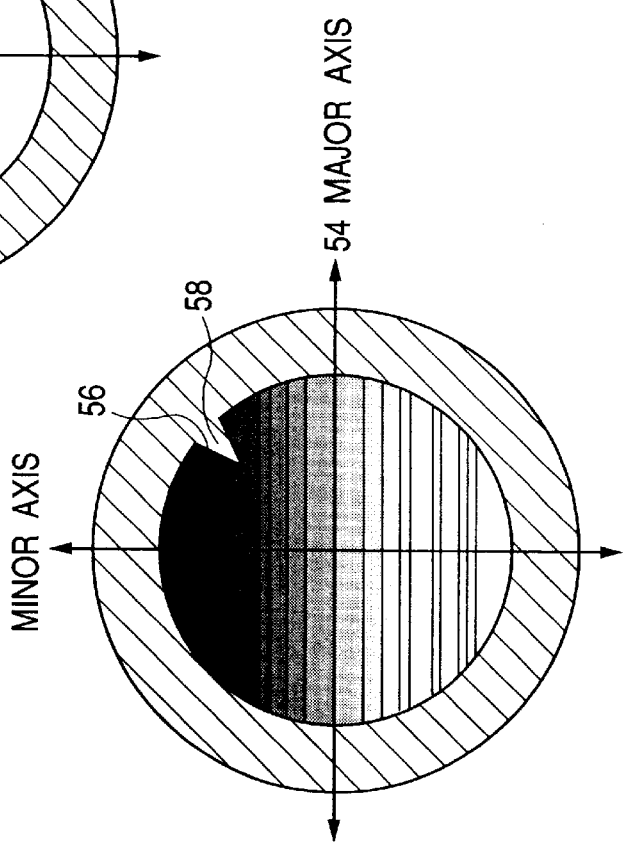

FIGS. 17A through 17C are illustrations showing the means for delimiting the direction of rotation of the anamorphic lens around the optical axis thereof, which is Embodiment 5 of the invention. In FIGS. 17A through 17C, the components same as those of FIGS. 16A through 16C are denoted respectively by the same reference symbols.

As shown in FIGS. 17A through 17C, a groove 56 is formed at the edge 50 of the outer periphery of the anamorphic lens 45 in place of the projection of Embodiment 4. On the other hand, a projection 58 is formed on the inner periphery of the lens barrel 52. Then, the projection 58 and the groove 56 are made to engage with each other to make them as effective as their counterparts of Embodiment 4.

As in the case of Embodiment 4, the profiles of the groove and the projection are not subjected to any limitations so long as they are snugly engaged with each other.

While in the case of using Numerical Example 4, the radius of curvature R of the major axis is made to agree with the radius of curvature 4 of the minor axis of the anamorphic surface 51 on the optical axis, it is not necessary to make them agree with each other.

Numerical Example 4 that can be used for an imaging lens according to the invention is shown below. In Numerical Example 4, Ri is the radius of curvature of the i-th lens surface as counted from the object and Di is the thickness of the i-th lens or air gap as counted from the object, while Ni and vi are respectively the refractive index for the d line and the Abbe's number of the glass of the i-th lens as counted from the object. For an anamorphic surface, coefficients of anamorphic surface are shown. The other symbols in Numerical Example 4 are same as their counterparts of Numerical Examples 1 through 3.

NUMERICAL EXAMPLE 4

| fe = 30.59 mm | FNO = 1:5.0 | 2ω = 60.0° | m = −0.189 |
|---|---|---|---|
| R1 = 16.201 | D1 = 1.87 | N1 = 1.772 | ν1 = 49.6 |
| R2 = 35.993 | D2 = 1.26 | | |
| R3 = −46.836 | D3 = 2.30 | N2 = 1.640 | ν2 = 34.5 |
| R4 = 22.827 | D4 = 3.14 | | |
| R5 = (diaphragm) | D5 = 0 | | |
| R6 = 18.418 | D6 = 6.27 | N3 = 1.772 | ν3 = 49.6 |
| R7 = −19.587 | D7 = 0.35 | | |
| R8 = −13.708 | D8 = 5.74 | N4 = 1.847 | ν4 = 23.8 |
| R9 = −18.096 | D9 = 7.31 | | |
| R10 = −11.562 | D10 = 1.00 | N5 = 1.699 | ν5 = 30.1 |
| R11 = −26.668 | | | | coefficients of anamorphic surface

| R10 = −11.562 | ky = $3.680 \times 10^{-1}$ | B4 = $-4.154 \times 10^{-6}$ | B6 = $5.351 \times 10^{-8}$ |
|---|---|---|---|
| | D2 = $-2.630 \times 10^{-3}$ | D4 = $2.820 \times 10^{-5}$ | D6 = $-2.267 \times 10^{-7}$ |

The present invention is by no means limited to the above described embodiments, which may be modified and/or altered in various different ways. Thus, the present invention includes any such modifications and alterations within the scope of the appended claims.

What is claimed is:

1. A color image reading apparatus comprising:

at least three line sensors arranged at predetermined intervals in the sub-scanning direction perpendicular to the main-scanning direction, each having a plurality of light receiving pixels arranged in the main-scanning direction;

an imaging optical system for forming a color image of an original laid on an original supporting plane on said line sensors, said imaging optical system including at least an anamorphic lens; and a drive means for driving said original and said line sensors relative to each other in the sub-scanning direction;

said apparatus satisfying the requirement expressed by formula below:

$$|Dis(s)| < 0.25 \cdot W/S_0,$$

where $S_0$ is the distance separating adjacently located line sensors, W is the width of the light receiving pixels in the sub-scanning direction and $Dis(s)$ is the distortion component of said imaging optical system in the sub-scanning direction.

2. A color image reading apparatus according to claim 1, further comprising:

a plurality of reflecting mirrors for leading the light beam from said original to said imaging optical system and a unit containing said reflecting mirrors, said imaging optical system and said line sensors, said drive means being adapted to drive said unit in the sub-scanning direction relative to the original supporting plane.

3. A color image reading apparatus according to claim 1, further comprising:

a light source for irradiating an original placed on said original supporting plane and a plurality of reflecting mirrors for leading the light beam from the original irradiated by said light source to said imaging optical system.

4. A color image reading apparatus according to claim 3, further comprising:

a unit containing said light source, said reflecting mirrors, said imaging optical system and said line sensors, said drive means being adapted to drive said unit in the sub-scanning direction relative to the original supporting plane.

5. A color image reading apparatus according to claim 1, further comprising:

a lens barrel having a groove for holding said imaging optical system on the inner periphery thereof, said anamorphic lens having a projection to be engaged with said groove of said lens barrel at the edge thereof.

6. A color image reading apparatus according to claim 1, further comprising:

a lens barrel having a projection for holding said imaging optical system on the inner periphery thereof, said anamorphic lens having a groove to be engaged with said projection of said lens barrel at the edge thereof.

* * * * *

UNITED STATES PATENT AND TRADEMARK OFFICE
CERTIFICATE OF CORRECTION

PATENT NO. : 6,307,661 B1
DATED : October 23, 2001
INVENTOR(S) : Fujibayashi, Kazuo et al.

It is certified that error appears in the above-identified patent and that said Letters Patent is hereby corrected as shown below:

Column 2,
Line 10, "dissolving" should read -- solving --; and
Line 44, "lense" should read -- lens --.

Column 5,
Line 27, "censor" should read -- sensor --.

Column 6,
Line 11, "Fives" should read -- five --.

Column 8,
Ex. 1, "original worth" should read -- original width --.

Signed and Sealed this

Twenty-third Day of April, 2002

Attest:

Attesting Officer

JAMES E. ROGAN
Director of the United States Patent and Trademark Office